US006961939B2

(12) United States Patent
Anderson et al.

(10) Patent No.: US 6,961,939 B2
(45) Date of Patent: Nov. 1, 2005

(54) TECHNIQUES FOR TRANSMISSION OF MESSAGE FRAGMENTS BETWEEN OBJECT REQUEST BROKERS

(75) Inventors: Edward E. Anderson, San Francisco, CA (US); Masood S. Mortazavi, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 554 days.

(21) Appl. No.: 09/777,261

(22) Filed: Feb. 5, 2001

(65) Prior Publication Data

US 2002/0107997 A1 Aug. 8, 2002

(51) Int. Cl.$^7$ ................................................. G06F 9/46
(52) U.S. Cl. ..................... 719/316; 709/202; 709/231; 709/232; 709/246; 719/315
(58) Field of Search ............................ 719/315–316; 709/202, 231, 232, 246, 310–320

(56) References Cited

U.S. PATENT DOCUMENTS

| | | | | |
|---|---|---|---|---|
| 6,003,083 | A | * 12/1999 | Davies et al. | 709/226 |
| 6,185,208 | B1 | * 2/2001 | Liao | 370/392 |
| 6,629,123 | B1 | * 9/2003 | Hunt | 709/106 |
| 6,629,128 | B1 | * 9/2003 | Glass | 709/203 |
| 6,633,923 | B1 | * 10/2003 | Kukura et al. | 709/316 |

OTHER PUBLICATIONS

Reconsidering Fragmentaion and Reassembly, Chandranmenon and Varghese published on Jun. 1998, Proceedings of the seventeenth annual ACM symposium on Principles of distributed computing.*
General Inter_ORB Protocol, Sep. 23, 1998, CORBA Draft 2.3□□A flexible, Optomizing Compiler, Eric Eide, 1997 ACM.*

The Design and Performance of a Scalable ORB Architecture for CORBA Asynchronous Messaging, Arulanthu, Apr. 2000, IFIP/ACM International Conference on Distributed systems platforms.*

Alignment and offsets in the presence of fragmentation, Jan. 1998, OMG, issue904.* x–kernel tutorial by Peterson, Davie and Bavier published on Jan. 1996.*

TCP/IP Illustrated vol. 1 by W. Richard Steven, Oct. 1993.*

(Continued)

Primary Examiner—Nabil El-Hady
Assistant Examiner—Mohammad Siddiqi
(74) Attorney, Agent, or Firm—Beyer Weaver & Thomas, LLP (57) ABSTRACT

Techniques for transmission of message fragments between Object Request Brokers operating in distributed object oriented environments. The techniques provide an elegant mechanism for fragmentation of messages into submessages. In one embodiment, a fragment-offset is provided as a means for determining the location of data bytes in sub-messages with respect to the original message that has been fragmented. During the construction and transmission of sub-messages, the fragment-offset can be updated to indicate the current offset with respect to the original message. Accordingly, in contrast to conventional techniques, a significant amount of computations or bookkeeping to track of several other variables (e.g., number of fragments constructed, total number of bytes constructed, etc.) are not required. As will appreciated, the headers of the sub-messages need not be of the same size. Similarly, the data portions of the sub-messages can vary in size. As a result, the techniques provides an elegant means to determine the location of bytes in sub-messages with respect to the original message that has been fragmented, without requiring the size of the data fragments and header fragments to be constant.

19 Claims, 6 Drawing Sheets

OTHER PUBLICATIONS

Postel J., "RFC 791: Internet Protocol", IETF Request for Comments, Sep. 1981, pp. 1–49, pp. 26–27.

Clip P., "IIOP: The Next HTTP?", Byte, McGraw–Hill Inc., St. Peterborough, U.S., vol. 23, No., 1, 1998, pp. 47–48.

Hutchinson, N.C. et al., "Tools for Implementing Network Protocols", Sep. 1989, John Wiley & Sons, Software Practice and Experience, pp. 898–906.

"The Common Object Request Broker: Architecture and Specification", Oct. 2000, Common Object Request Broker Architecture (CORBA) v2.4, Chapters 1–3.

"General Inter–ORB Protocal", Oct. 2000, Common Object Request Broker Architecture (CORBA) v2.4, Chapter 15, p. 1–64.

* cited by examiner

TECHNIQUES FOR TRANSMISSION OF MESSAGE FRAGMENTS BETWEEN OBJECT REQUEST BROKERS

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. The Field of the Invention

The present invention relates to the fields of distributed computing systems, client-server computing and object-oriented programming. More particularly, the present invention relates to techniques for transmission of message fragments between Object Request Brokers operating in distributed object oriented environments.

2. The Relevant Art

Object oriented programming methodologies have received increasing attention over the past several years in response to the increasing tendency for software developed using traditional programming methods to be delivered late and over budget. One problem with traditional programming techniques stems from the emphasis placed on procedural models and "linear" code that often is extremely difficult to design and maintain. Generally, large programs created using traditional methods are "brittle." That is, even small changes to isolated elements of the program can affect all elements of the programming code. Thus, minor changes made to the software in response to user demands can require major redesign and rewriting of the entire program.

Object oriented programming strategies tend to avoid these problems because object methodologies focus on pairing data and the procedures that act on it; thus providing the programmer with a more intuitive approach to modeling real world problems. In addition, objects encapsulate related data and procedures so as to hide that information from the remainder of the program by allowing access to the data and procedures only through the object's interface. Hence, changes to the data and/or procedures of the object are relatively isolated from the remainder of the program. This provides code that is more easily maintained as compared to code written using traditional methods, since changes to an object's code do not affect the code in the other objects. In addition, the inherent modular nature of objects allows individual objects to be reused in different programs. Thus, programmers can develop libraries of "tried and true" objects that can be used over and over again in different applications. This increases software reliability while decreasing development time, as reliable programming code may be used repeatedly.

The object metaphor in distributed systems is a useful technique as it separates the object's interface from its implementation; thus allowing software designers to take advantage of the functionalities of various objects available to them without having to worry about the details of the object's implementation. The programmer need only be aware of the object's interface. In addition, object oriented distributed systems allow for multiple implementations of a single interface, which interface may reside on different computing platforms that have been connected through a network. Thus, a programmer working on one machine of a network may make a call to an object about which the programmer has no detailed knowledge with the confidence that at the appropriate time that the remote object will be accessed and return its data so that the programmer's code will function properly. Such a system thus maximizes the inherent advantages of object oriented methodologies by taking full advantage of their modularity and encapsulation.

Attempts to provide such facilities have been made using object oriented distributed systems that are based upon a client-server model, in which object-servers provide interfaces to clients that make requests of the object-servers. Typically, in such systems these servers are objects consisting of data and associated methods. The clients obtain access to the functionalities of the object-servers by executing calls on them, which calls are mediated by the distributed system. When the object-server receives the call, it executes the appropriate method and transmits the result back to the object-client. The client and object-server communicate through an Object Request Broker (ORB) that is used to locate the various distributed objects and establish communications there between. The Object Request Broker enables objects to transparently make and receive requests and responses in a distributed environment.

Figure 1A:
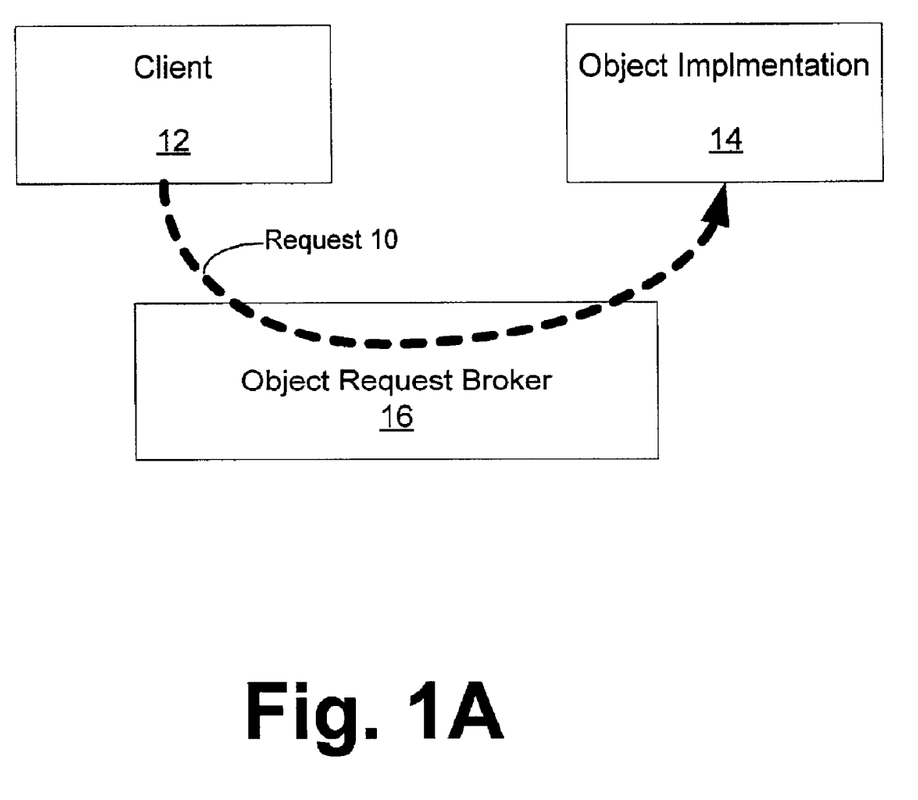
FIG. 1A illustrates a request being sent by a client to an object implementation through an Object Request Broker.

FIG. 1A illustrates a request 10 being sent by a client 12 to an object implementation through an Object Request Broker 16. The client can be defined as an entity that wishes to perform an operation on an object. The object implementation can be defined as the code and data that actually implements the object. The Object Request Broker is responsible for all the mechanisms required to find the object implementation for the request, to prepare the object implementation to receive the request, and to communicate the data making up the request. The interface the client sees is completely independent of where the object is located, what programming language it is implemented in, or any other aspect that is not reflected in the object interface. More details about the Object Request Broker can be found in the "Common Object Request Broker: Architecture and Specification: CORBA 2.4.1", November, 2000, which is hereby incorporated herein by reference.

Figure 1B:
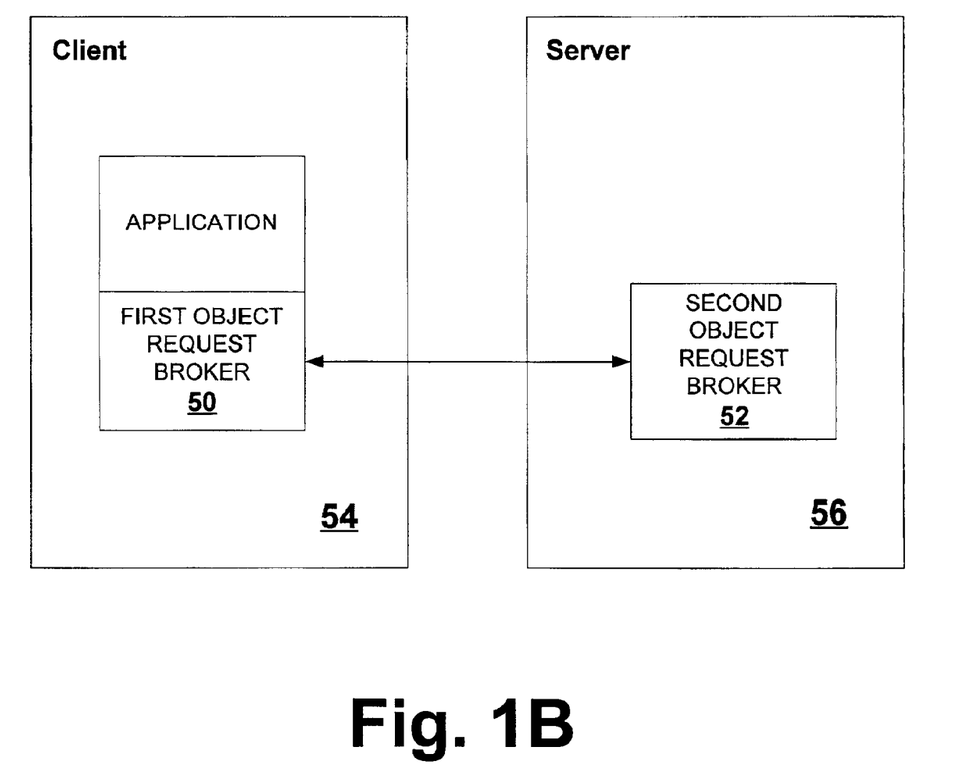
FIG. 1B illustrates a first and second Object Request Broker and exchanging messages.

As described in the Common Object Request Broker Architecture and Specification, General Inter-ORB protocol (GIOP) specifies formats for messages that are exchanged between inter-operating ORBs. FIG. 1B illustrates a first and second Object Request Broker and 52 exchanging messages. For example, the first Object Request Broker 50 can operate in client 54 and send messages to and receive messages from the second Object Request Broker 52 operating in a server 56. As is known those skilled in the art, in some situations, it is desirable to fragment messages that are exchanged between inter-operating ORBs. In other words, there is a need to fragment a message (original message) into two or more sub-messages. The original message typically includes a header and data. The corresponding fragments can also include headers and data portions which collectively represent the data in the original message.

It is often necessary to know the corresponding position of a given data byte in one of the sub-messages with respect to its position in the original message. One reason why this may be necessary is that there may be a reference to data in the original message rather than another copy of data. Since it may be necessary to know the location of a data byte with respect to its location in the original message, some conventional techniques wait until all the fragments have been constructed before any of the data fragments are transferred. However, this approach is grossly inefficient and may cause delays in data transmission between ORBs. To avoid such pitfalls, some recent techniques have been developed to allow for more efficient transmission of messages. However, these techniques put certain constraints on the transmission of data fragments. For example, the fragment header and/or fragment data sizes need to be of the same size for these techniques to work properly. In addition to the constraints, a significant amount of bookkeeping and many computations are often necessary since the conventional techniques require keeping track of several variables (e.g., number of fragments constructed, total number of bytes, etc.).

Accordingly, there is a need for techniques to facilitate transmission of message fragments in distributed object oriented environments.

SUMMARY OF THE INVENTION

Broadly speaking, the invention relates to techniques for transmission of message fragments between Object Request Brokers operating in distributed object oriented environments. In one aspect, the techniques provide an elegant mechanism for fragmentation of messages into sub-messages. In one embodiment, a fragment-offset is provided as a means for determining the location of data bytes in sub-messages with respect to the original message that has been fragmented. During the construction and transmission of sub-messages, the fragment-offset can be updated to allow the calculation of the current offset with respect to the original message. Accordingly, in contrast to conventional techniques, a significant amount of computations or bookkeeping to keep track of several other variables (e.g., number of fragments constructed, total number of bytes constructed, etc.) are not required. As will appreciated, the headers of the sub-messages need not be of the same size. Similarly, the data portions of the sub-messages can vary in size. As a result, the present invention provides an elegant means to determine the location of bytes in sub-messages with respect to the original message that has been fragmented, without requiring the size of the data fragments and header fragments to be constant.

The invention can be implemented in various embodiments including a method, a computing system, and a computer readable media. Some of these embodiments are discussed below.

As a method for sending a message from a first common Object Request Broker to a second common Object Request Broker operating in a distributed object oriented environment, one embodiment of the invention includes the acts of: determining whether the message is to be fragmented into two or more sub-messages; initiating construction of a sub-message when the determining determines that the message is to be fragmented into two or more sub-messages; initializing an offset-variable to zero when the determining determines that the message is to be fragmented into two or more sub-messages; determining whether there is a need to know the position of a byte of the sub-message with respect to the message; reading the offset-variable when the determining determines that there is a need to know the position of a byte of the sub-message with respect to the message; and completing construction of the sub-message based on the offset-variable; updating the offset-variable; and sending a constructed sub-message from the first common Object Request Broker to a second common Object Request Broker.

As a computing system operating in a distributed object oriented environment, one embodiment of the invention includes: a first common Object Request Broker operating to send a message to a second common Object Request Broker, the message being transmitted by the first common Object Request Broker in two or more sub-messages in a sequence, and wherein the position of a byte of a sub-message with respect to the message can be determined based on a offset-variable by subtracting the length of the header of the sub-message from the length of another sub-message immediately preceding the sub-message, and then adding the result of the subtraction to the value of the offset-variable.

As another method of sending a message from a first common Object Request Broker to a second common Object Request Broker operating in a distributed object oriented environment, one embodiment of the invention includes the acts of: initiating construction of a sub-message when the determining determines that the message is to be sent in two or more sub-messages; determining whether there is a need to know the position of a byte of the sub-message with respect to the message; reading the offset-variable when the determining determines that there is a need to know the position of a byte of the sub-message with respect to the message; completing construction of the sub-message based on the offset-variable; and updating the offset-variable by subtracting the length of the header of the sub-message from the length of another sub-message that was constructed immediately prior to construction of the sub-message and adding the result of the subtraction to the value of the offset-variable.

As a computer readable media including computer program code for sending a message from a first common Object Request Broker to a second common Object Request Broker operating in a distributed object oriented environment, one embodiment of the invention includes: computer program code for determining whether the message is to be fragmented in two or more sub-messages; computer program code for initiating construction of a sub-message when the determining determines that the message is to be sent in two or more sub-messages; computer program code for initializing an offset-variable to zero when the determining determines that the message is to be fragmented in two or more sub-messages; computer program code for determining whether there is a need to know the position of a byte of the sub-message with respect to the message; computer program code for reading the offset-variable when the determining determines that there is a need to know the position of a byte of the sub-message with respect to the message; computer program code for completing construction of the sub-message based on the offset-variable; computer program code for updating the offset-variable; and computer program code for sending a constructed sub-message from the first common Object Request Broker to a second common Object Request Broker.

These and other aspects and advantages of the present invention, will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention pertains to techniques for transmission of message fragments between Object Request Brokers operating in distributed object oriented environments. In one aspect, the techniques provide an elegant mechanism for fragmentation of messages into sub-messages. In one embodiment, a fragment-offset is provided as a means for determining the location of data bytes in sub-messages with respect to the original message that has been fragmented. During the construction and transmission of sub-messages, the fragment-offset can be updated to indicate the current offset with respect to the original message. Accordingly, in contrast to conventional techniques, a significant amount of computations or bookkeeping to track of several other variables (e.g., number of fragments constructed, total number of bytes constructed, etc.) are not required. As will be appreciated, the headers of the sub-messages need not be of the same size. Similarly, the data portions of the sub-messages can vary in size. As a result, the present invention provides an elegant means to determine the location of bytes in sub-messages with respect to the original message that has been fragmented, without requiring the size of the data fragments and header fragments to be constant.

Figure 2:
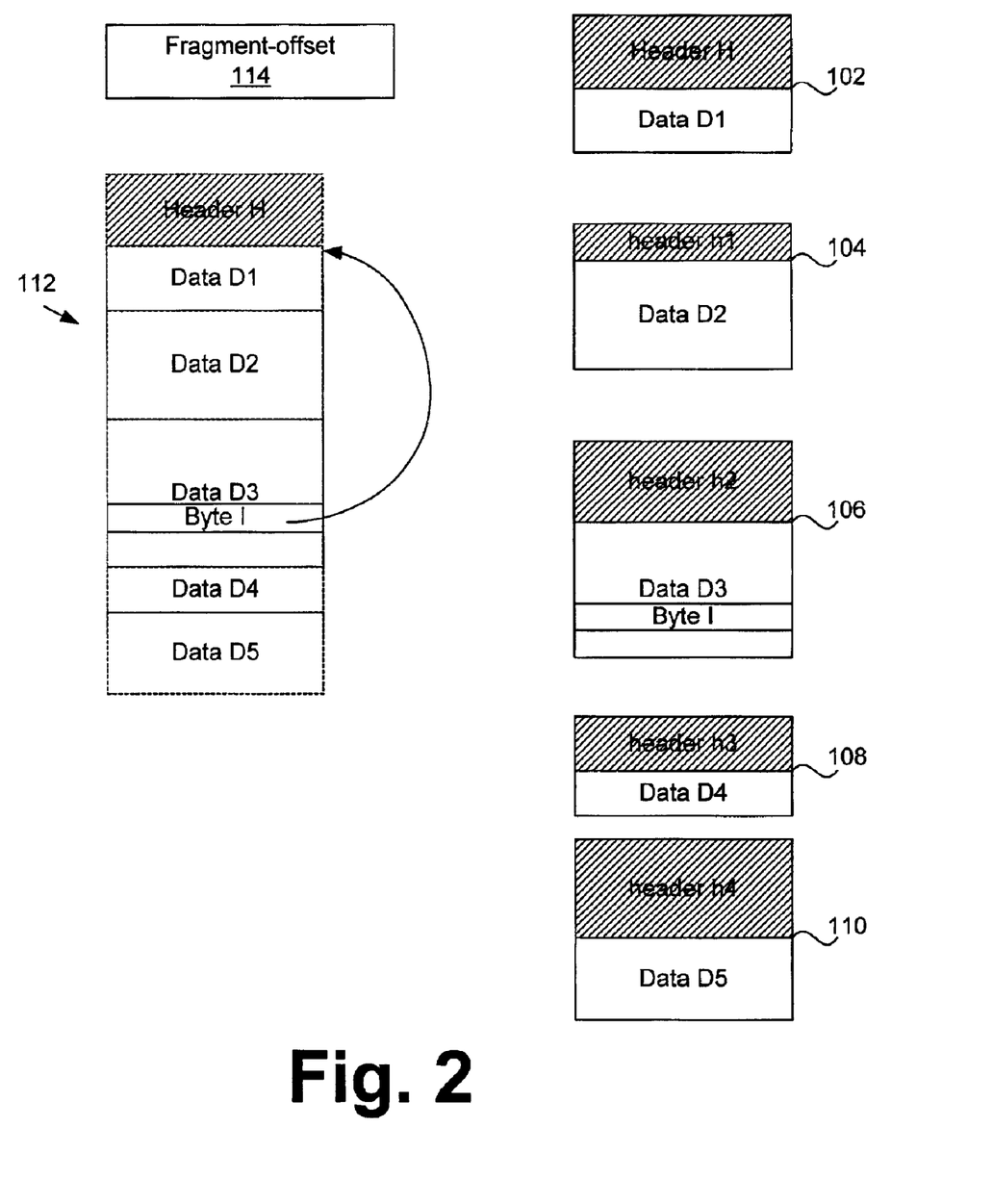
FIG. 2 depicts a sequence of sub-messages constructed from a message that is to be transmitted between Object Request Brokers in accordance with one embodiment of the invention.

FIG. 2 depicts a sequence of sub-messages 102–110 constructed from a message 112 that is to be transmitted between Object Request Brokers in accordance with one embodiment of the invention. The message 112 ("original message") includes a header H and data that can be represented as data segments D1–D5. The corresponding sub-messages 102–110 respectively include headers h1–h4 and data portions D1–D5. Thus, the corresponding sub-messages 102–110 represent the original message 112 and collectively include its data. In the described embodiment, header H of the original message 112 is copied as the header H of the first sub-message in the sequence, the sub-message 102. It should be noted that headers h1–h4 do not need to be the same size. Accordingly, the size of a header for a sub-message can vary from the size of the header of another sub-message, as well as varying from the size of the header H of the original message 112. Similarly, the data D1–D5 can vary in size.

As noted in the background, in order to construct sub-messages 102–110 from the message 112, it may be necessary to know the corresponding position of a given data byte in one of the sub-messages 102–110 with respect to its position in the original message 112. For example, it may be necessary to know the corresponding location of a given Byte I of data portion D3 with respect to its location in the original 112 message (i.e., know what byte number Byte I is in the original message). One reason why it may be necessary to know the location of a data byte in a fragmented message with respect to the original message is that there may be a reference to data, rather than another copy of data.

For example, Byte I may be pointing to data segment D1 to represented the data in the original message. To achieve this, a fragment-offset 114 can be provided. As will be described below, the fragment-offset 114 can be used to determine the location of data bytes in the sub-messages 102–110 with respect to their position in the original message. For example, when the sub-message 106 is being constructed, the fragment-offset 114 can indicate the location of the first byte of the data portion D3 in the original message 112. Thus, the byte number of the byte I can be easily determined based on the location of the first byte of the data portion D3.

Figure 3:
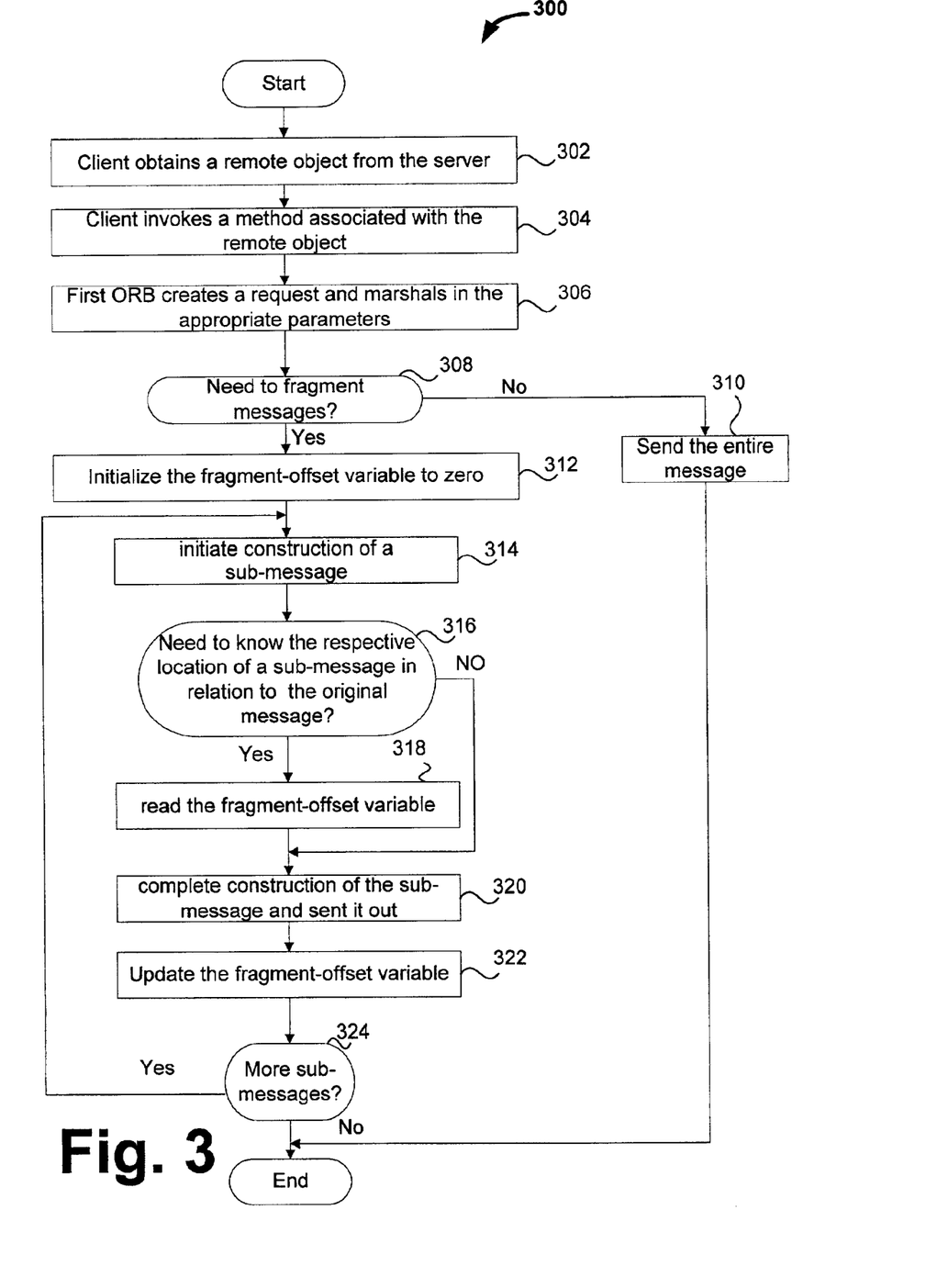
FIG. 3 illustrates a method for transmission of sub-messages constructed from a message that is to be transmitted by a first Object Request Broker to a second Object Request Broker operating in a distributed operating environment, in accordance with one embodiment of the invention.

As noted above, the invention provides for transmission of message fragments between Object Request Brokers operating in distributed object oriented environments. FIG. 3, illustrates a method 300 for transmission of sub-messages constructed from a message that is to be transmitted by a first Object Request Broker to a second Object Request Broker operating in a distributed operating environment, in accordance with one embodiment of the invention. The first Object Request Broker can, for example, facilitate the communication of a client with a server. Accordingly, the second Object Request Broker can operate in the server.

Initially, at operation 302, the client obtains a remote object from the server. The client invokes a method associated with the remote object at operation 304. Next, at operation 306, the first Object Request Broker creates a request and marshals in the appropriate parameters. It should be noted that at this point a message is available to be transmitted from the first Object Request Broker to the second Object Request Broker. Accordingly, at operation 308 a determination is made as to whether there is a need to fragment this message into two or more sub-messages. If it is determined at operation 308 that there is no need to fragment this message, the method 300 proceeds to operation 310 where the entire message is transmitted. The method 300 ends after operation 310.

On the other hand, if it is determined at operation 308 that there is a need to fragment this message ("original message") into two or more sub-messages, the method 300 proceeds to operation 312 where a fragment-offset variable is initialized to zero. Next, at operation 314, the construction a message fragment is initiated. At operation 316, a determination is made as to whether there is need to know the location of a byte of the sub-message that is being constructed with respect to it relative position in the original message. If it is determined at operation 316 that there is a need to know the respective location of one or more bytes in the sub-message that is being constructed with respect to their position in the original message, the method 300 proceeds to operation 318 where the fragment-offset variable is read. As will be appreciated, the position of the one or more bytes can be determined based on the value indicated by the fragment-offset variable. Accordingly, the construction of the sub-message can be completed and the sub-message is transmitted at operation 320.

However, if it is determined at operation 316 that there is no need to know the respective location of at least one byte of the sub-message that is being constructed with respect to its position in the original message, the method 300 proceeds directly to operation 320 bypassing the operation 318. In any case, after the sub-message has been transmitted at operation 320, the method 300 proceeds to operation 322 where the fragment-offset variable is updated. The updating performed in operation 322 will be described below in accordance with one embodiment of the invention. After the updating performed at operation 322, the method 300 proceeds to operation 324 where a determination is made as to whether there are more sub-messages to be constructed. If it is determined at operation 324 that there is at least one sub-message to be constructed, the method 300 proceeds to operation 314 where construction of the sub-message is initiated. However, if it is determined at operation 324 that there is not at least one sub-message to be constructed, the method 300 ends.

Figure 4:
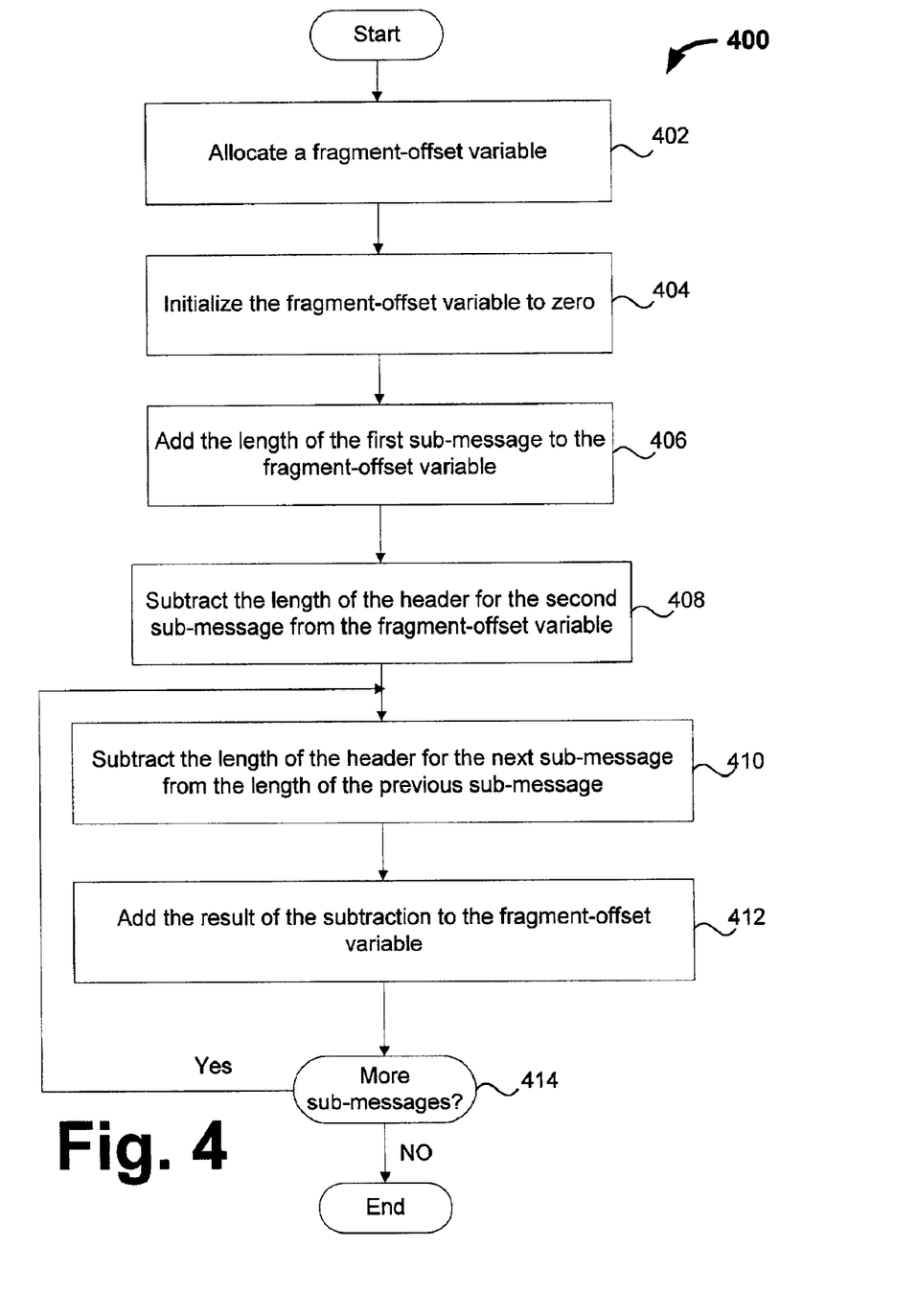
FIG. 4 illustrates an updating method for updating a fragment-offset variable in accordance with one embodiment of the invention.

FIG. 4 illustrates an updating method 400 for updating a fragment-offset variable in accordance with one embodiment of the invention. The method 400 illustrates in greater detail processing that can be performed at operations 312 and 322 of FIG. 3. Initially, at operation 402, a fragment-offset variable is allocated. Next, at operation 404, the fragment-offset variable is initialized to zero. At operation 406, the length of the first constructed sub-message is added to the fragment-offset variable. It should be noted that the length of the first sub-message (e.g., sub-message 102 of FIG. 2) includes the length of the header and the length of the data (e.g., the length of H added to length of D1 of sub-message 102 shown in FIG. 2). Accordingly, the value indicated by the fragment-offset variable would be equal the length of the first constructed sub-message. Next, at operation 408, the length of the header of the second sub-message (e.g., h2 of sub-message 104 shown in FIG. 2) is subtracted from the fragment-offset variable.

Thereafter, the method 400 proceeds to operation 410 where the length of the header for the next sub-message (e.g., h2 of sub-message 106 shown in FIG. 2) is subtracted from the length of the previous sub-message (e.g., sub-message 104 of FIG. 2). Again, the length of the previous sub-message constructed (e.g., sub-message 104 of FIG. 4) includes the length of the header and the length of the data. The result of the subtraction is then added to the fragment-offset variable at operation 412. Next, at operation 414, a determination is made as to whether there are more sub-messages to be constructed. If it is determined at operation 414 that there is at least one sub-messages to be constructed, the method proceeds to operation 410 where the length of the header for the next sub-message is subtracted from the length of the previous sub-message. When it is determined at operation 414 that there is not at least one sub-message to be constructed, the method 400 ends.

Figure 5:
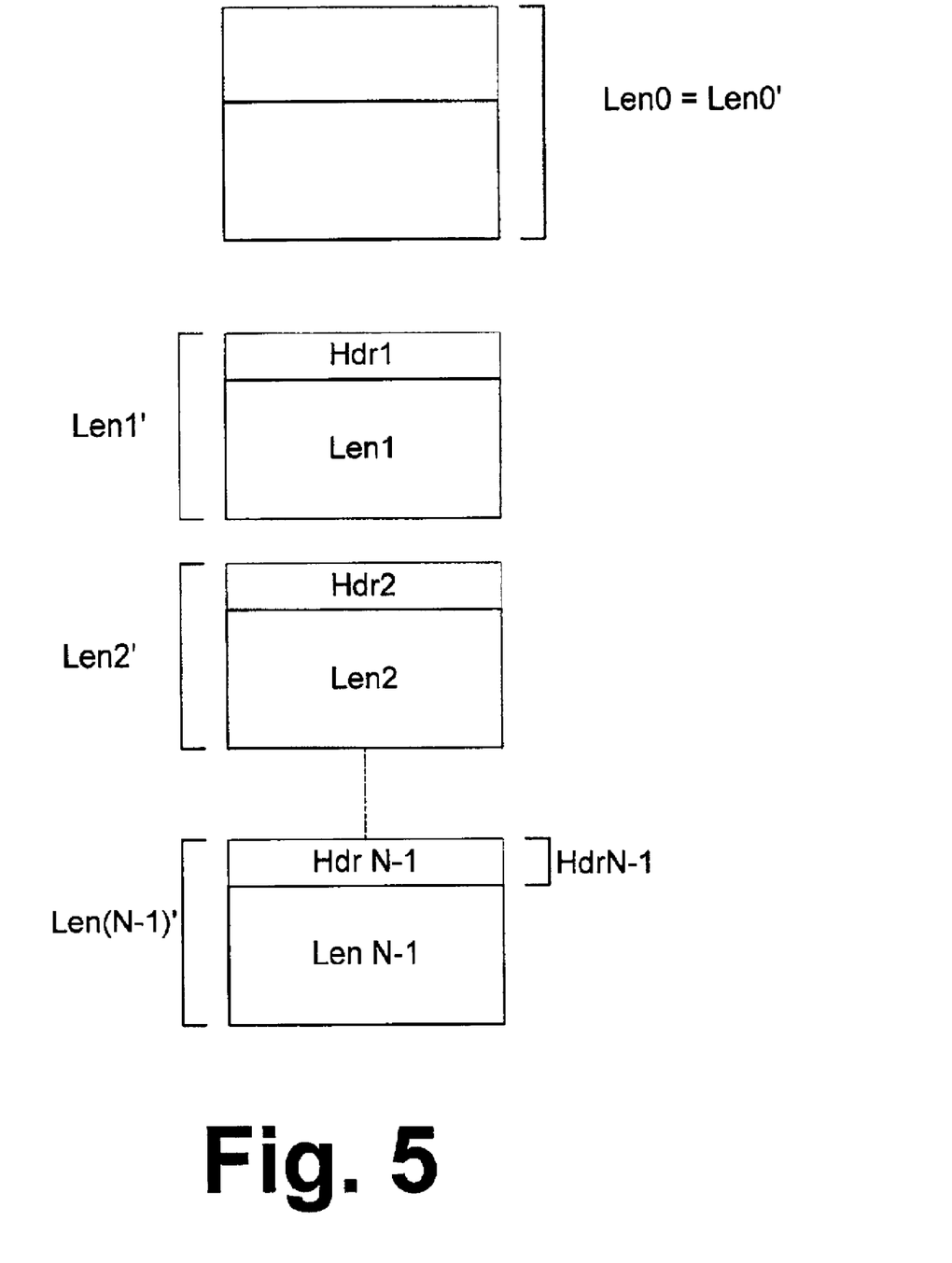
FIG. 5 illustrates a mathematical representation of the updating method of FIG. 4.

To further elaborate, an equation 500 below illustrates a mathematical representation of the updating method 400 of FIG. 4. The equation 500 can be expressed in terms of a summation of the term:

$$\Sigma(Len'_{i-1} = Hdr_i)$$

taken for i=1 to N−1, where N is an integer representing the number of sub-message in a sequence of sub-messages constructed from the original message. Accordingly, for the i-th sub-message to be constructed, the $Len'_{i-1}$ represents the size of the previous sub-message, message (i-1). The term $Hdr_i$ represents the length of the header of the sub-message i. Thus, equation 500 can be evaluated, for example, for N=5 to determine the offset of a byte in the $5^{th}$ sub-message with respect to its location in the original message. It should be noted that in the described embodiment, Len'0 and Len0 are interchangeable. However, as illustrated in FIG. 5, in general, $Len'_i$ represents the total size of the sub-message i, while $Len_i$ is the length of the data in the sub-message i. To provide an example, for N=5, the equation 500 can be reduced to the appropriate value: (len0+len1+len2+len3) where len0 is the length of the first sub-message, and len1, len2, and len3 respectively represent the length of data contained in sun-messages 2, 3 and 4.

What is claimed:

1. A method of sending a message from a first common Object Request Broker to a second common Object Request Broker operating in a distributed object oriented environment, said method comprising:

determining whether the message which is to be sent from a first common Object Request Broker to a second common Object Request Broker should be fragmented into two or more sub-messages;

initiating construction of a sub-message which is to be sent from a first common Object Request Broker to a second common Object Request Broker when said determining determines that said message is to be sent in two or more sub-messages;

initializing an offset-variable for said message to zero when said determining determines that said message is to be fragmented into two or more sub-messages;

determining whether there is a need to know the position of a byte of the sub-message with respect to the message;

reading the offset-variable for said message when said determining determines that there is a need to know the position of a byte of the sub-message with respect to the message;

completing construction of the sub-message based on the offset-variable for said message;

updating the offset-variable for said message; and sending a constructed sub-message, which has been constructed based on the offset-variable from the first common Object Request Broker to a second common Object Request Broker.

2. A method as recited in claim 1, wherein said sub-message has a header that includes one or more bytes, and wherein said updating of the offset-variable comprises:

subtracting the length of the header of the sub-message from the length of another sub-message that was constructed immediately prior to construction of the sub-message.

3. A method as recited in claim 2, where said updating further comprises:

updating the offset-variable by adding the result of said subtracting to the value of the offset-variable.

4. A method as recited in claim 3, wherein the message is fragmented into N sub-messages, sub-message 0 to sub-message N, where N is a positive integer, and wherein the first sub-message has a header with the same number of bytes as the header of the message.

5. A method as recited in claim 4, wherein the updating is performed based on the summation $(L_{i-1} - H_i)$ taken from i=1 to i=N−1, where $L_i$ is the length of the sub-message i and $H_i$ is the length header of the sub-message i.

6. A method as recited in claim 5, wherein at least two of the headers of the sub-messages 1 to N can be of different lengths.

7. A method as recited in claim 1, wherein the method further comprises:

obtaining a remote object; and invoking a method associated with the object.

8. A method as recited in claim 7, wherein said obtaining of the remote object and said invoking of a method associated with the object is performed by a client operating in the distributed object oriented environment, and wherein the first Object Request Broker creates a request and marshals in appropriate parameters.

9. A method of sending a message from a first common Object Request Broker to a second common Object Request Broker operating in a distributed object oriented environment, said method comprising:
   initiating construction of a sub-message that is to be sent from a first common Object Request Broker to a second common Object Request Broker;
   determining whether there is a need to know the position of a byte of the sub-message with respect to the message;
   reading an offset-variable when said determining determines that there is a need to know the position of a byte of the sub-message with respect to the message;
   completing construction of the sub-message based on the offset-variable; and
   updating the offset-variable by subtracting the length of the header of the sub-message from the length of another sub-message that was constructed immediately prior to construction of the sub-message and adding the result of the subtraction to the value of the offset-variable.

10. A method as recited in claim 9, wherein the sub-message is constructed with a header that has the same number of bytes as the header of the message.

11. A method as recited in claim 9, wherein at least two of the headers of the sub-messages can be of different lengths.

12. A method as recited in claim 9, wherein at least two of the sub-messages have data portions that are respectively of different sizes.

13. A computer readable media including computer program code for sending a message from a first common Object Request Broker to a second common Object Request Broker operating in a distributed object oriented environment, said method comprising:
   computer program code for determining whether the message which is to be sent from the first common Object Request Broker to the second common Object Request Broker should be fragmented into two or more sub-messages;
   computer program code for initiating construction of a sub-message when said determining determines that said message is to be sent in two or more sub-messages;
   computer program code for initializing an offset-variable to zero when said determining determines that said message is to be fragmented in two or more sub-messages;
   computer program code for determining whether there is a need to know the position of a byte of the sub-message with respect to the message;
   computer program code for reading the offset-variable when said determining determines that there is a need to know the position of a byte of the sub-message with respect to the message;
   computer program code for completing construction of the sub-message based on the offset-variable;
   computer program code for updating the offset-variable; and
   computer program code for sending a constructed sub-message from the first common Object Request Broker to a second common Object Request Broker.

14. A computer readable media as recited in claim 13, wherein said sub-message has a header that includes one or more bytes, and
   wherein said computer program code for updating the offset variable comprises:
   computer program code for subtracting the length of the header of the sub-message from the length of another sub-message that was constructed immediately prior to construction of the sub-message.

15. A computer readable media as recited in claim 13, wherein said computer program code for updating further comprises:
   computer program code for updating the offset-variable by adding the result of said subtracting to the value of the offset-variable.

16. A computer readable media as recited in claim 13, wherein at least two of the headers of the sub-messages can be of different lengths.

17. A computer readable media as recited in claim 13, wherein at least two of the data portions of the sub-messages can be of different lengths.

18. A method of sending a message from a first common Object Request Broker to a second common Object Request Broker operating in a distributed object oriented environment, said method comprising:
   providing a message fragment offset-variable for the first common Object Request Broker, wherein the message fragment offset-variable indicates an offset of the message that is to be sent by the first common Object Request Broker to a second common Object Request Broker;
   determining whether the message is to be fragmented in two or more sub-messages;
   initiating construction of a sub-message when said determining determines that said message is to be sent in two or more sub-messages;
   completing construction of the sub-message based on the message fragment offset-variable to generate a constructed sub-message; and
   sending the constructed sub-message from the first common Object Request Broker to a second common Object Request Broker.

19. A method as recited in claim 18, wherein said method further comprises:
   updating the fragment offset-variable by subtracting the length of the header of the sub-message from the length of another sub-message that was constructed immediately prior to construction of the sub-massage and adding the result of the subtraction to the value of the offset-variable.

* * * * *

UNITED STATES PATENT AND TRADEMARK OFFICE
CERTIFICATE OF CORRECTION

PATENT NO. : 6,961,939 B2
DATED : November 1, 2005
INVENTOR(S) : Anderson et al.

It is certified that error appears in the above-identified patent and that said Letters Patent is hereby corrected as shown below:

Column 2,
Line 24, add -- 14 -- after "implementation".
Line 44, add -- 50 -- after "Object Request Broker".

Signed and Sealed this

Ninth Day of May, 2006

JON W. DUDAS
*Director of the United States Patent and Trademark Office*